(12) United States Patent
Klepp

(10) Patent No.: US 7,901,096 B2
(45) Date of Patent: Mar. 8, 2011

(54) ILLUMINATION FOR PROJECTING AN IMAGE

(75) Inventor: Peter Donald Klepp, Hopewell Jct, NY (US)

(73) Assignee: Dorsey Metrology International, Poughkeepsie, NY (US)

( * ) Notice: Subject to any disclaimer, the term of this patent is extended or adjusted under 35 U.S.C. 154(b) by 763 days.

(21) Appl. No.: 11/879,124

(22) Filed: Jul. 16, 2007

(65) Prior Publication Data

US 2008/0024732 A1 Jan. 31, 2008

Related U.S. Application Data

(60) Provisional application No. 60/831,369, filed on Jul. 17, 2006.

(51) Int. Cl.
*G03B 21/00* (2006.01)

(52) U.S. Cl. ............. 353/122; 353/30; 353/31; 353/119; 362/294; 362/373; 362/235; 362/236; 362/244; 362/249.02; 362/237; 362/238; 362/239; 362/240; 362/241; 362/242; 362/243; 362/245; 362/246; 362/247; 362/248; 362/268; 362/299; 356/600; 356/601; 356/602; 356/603; 356/604; 356/605; 356/607; 356/608; 356/609; 356/610; 356/611; 356/612; 356/613; 356/237.1; 356/237.2; 356/237.3; 356/239.1; 356/239.2; 356/239.7; 356/239.8; 356/429; 356/430; 356/431

(58) Field of Classification Search ............... 353/30, 353/31, 119, 122; 362/294, 373, 235, 236, 362/244, 249.02, 237, 238, 239, 240, 241, 362/242, 243, 245, 246, 247, 248, 268, 299, 362/300; 356/600, 601, 602, 603, 604, 605, 356/607, 608, 609, 610, 611, 612, 613, 237.1, 356/237.2, 237.3, 239.1, 239.2, 239.7, 239.8, 356/429, 430, 431

See application file for complete search history.

(56) References Cited

U.S. PATENT DOCUMENTS

| | | | |
|---|---|---|---|
| 6,832,849 B2 * | 12/2004 | Yoneda et al. | 362/551 |
| 7,175,305 B2 * | 2/2007 | Martineau | 362/244 |
| 7,198,397 B2 | 4/2007 | Bennett et al. | |
| 7,221,462 B2 * | 5/2007 | Cavallucci | 356/614 |
| 7,229,201 B2 | 6/2007 | Krupa et al. | |
| 2005/0117782 A1 * | 6/2005 | Imaoka et al. | 382/117 |
| 2006/0132774 A1 * | 6/2006 | Mullani | 356/369 |
| 2006/0158896 A1 | 7/2006 | Krupa et al. | |
| 2006/0274526 A1 * | 12/2006 | Weston et al. | 362/252 |
| 2007/0086205 A1 | 4/2007 | Krupa et al. | |
| 2008/0024794 A1 * | 1/2008 | Miyazaki et al. | 356/612 |

* cited by examiner

*Primary Examiner* — Georgia Y Epps
*Assistant Examiner* — Sultan Chowdhury
(74) *Attorney, Agent, or Firm* — Saile Ackerman LLC; Stephen B. Ackerman

(57) ABSTRACT

The invention is directed to a method for illuminating an object and projecting its image on a ground glass screen. Optical comparators conventionally use incandescent illumination, either mercury arc or halogen. The use of an array of high intensity LED devices, provides many options for packaging the required optical components used in comparators.

26 Claims, 4 Drawing Sheets

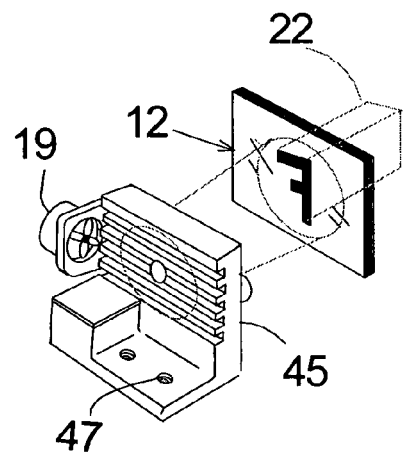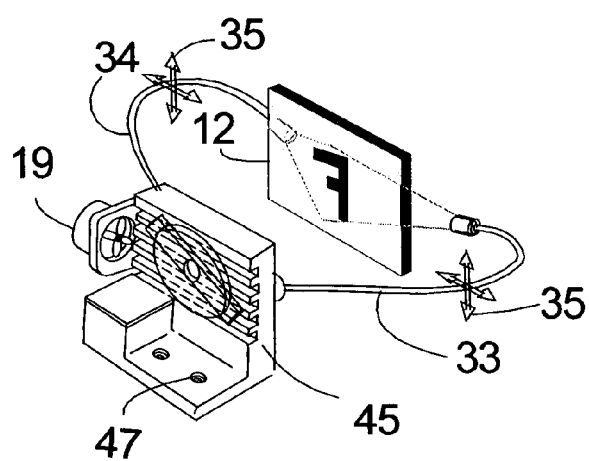
FIG. 2
FIG. 4
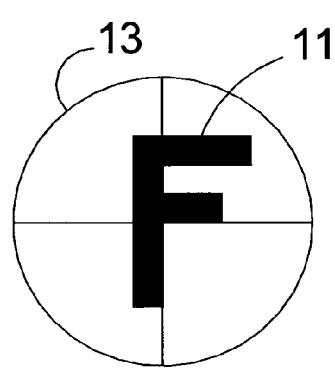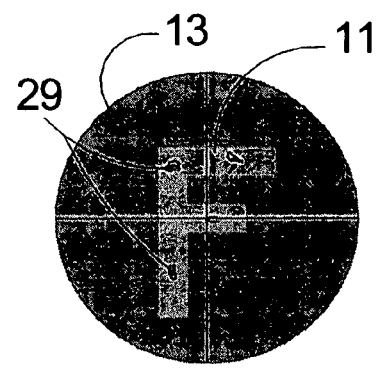
FIG. 3
FIG. 5

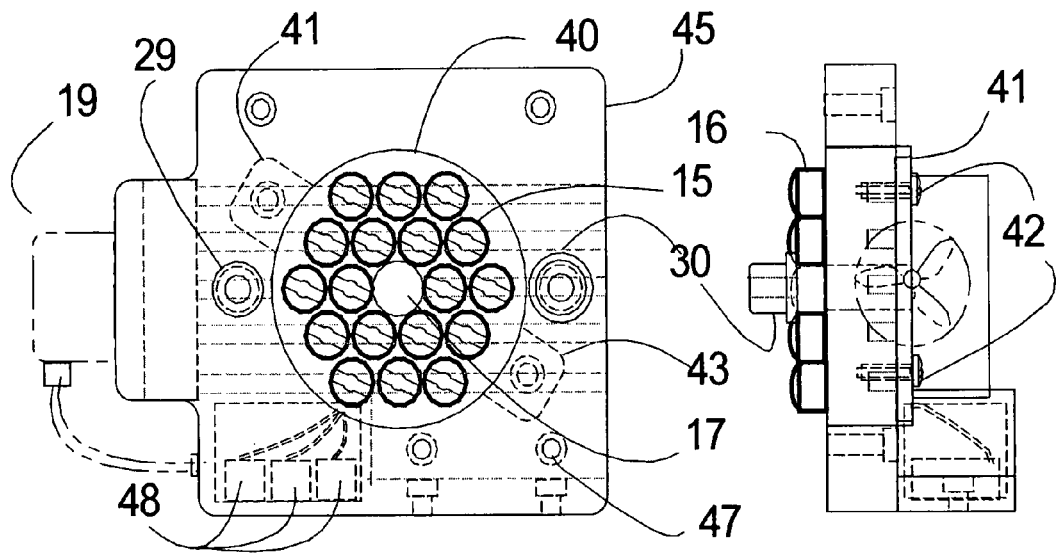
FIG. 6  FIG. 7
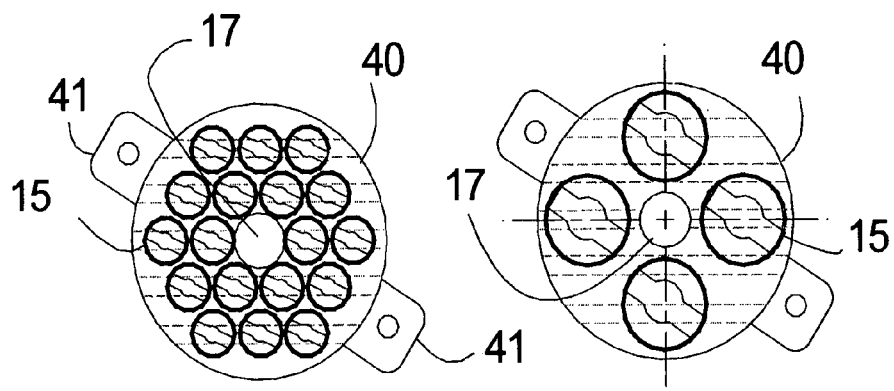
FIG. 8  FIG. 9

ILLUMINATION FOR PROJECTING AN IMAGE

This application claims priority to U.S. Provisional application 60/831,369, filed on Jul. 17, 2006, and herein incorporated by reference in its entirety.

BACKGROUND OF THE INVENTION (1) Technical Field

The present invention relates to projection optical tools, and more particularly to LED (Light Emitting Diode) lamps, furthermore, it relates to the configuration of LED lamps suitable for use as light sources for image projection.

(2) Description of the Prior Art

In today's manufacturing environment, most operations employ a blend of new technology with tried and reliable older systems. Many manufacturers feature the well proven easily used optical comparator as an inspection tool of choice for measuring parts. As competition increases in the world market, new and improved measuring tools are vital to enhance product quality as well as reduction of product cost.

During inspection of manufactured parts, optical comparators, also called profile projectors, offer a much larger field of view and cause less eye fatigue over long usage. The saying "seeing is believing" is appropriate when referring to optical comparators. Since these measurement tools project magnified images onto a glass screen to make two dimensional measurements, a tremendous amount of information about that part can be gathered in a short time simply by looking at its image.

There are many diverse types of image-capturing methods within the prior art and, accordingly, there exist arrangements with a variety of applications including a wide range of sizes. Optical comparators are easier to use than most other optical measuring tools and much more all-encompassing in the market and less expensive than the more complicated coordinate measuring machine. Their versatility, range of capabilities and return on investment make comparators indispensable and integral to any quality plan. There's hardly anything to wear out on them except for having to replace blown out incandescent lamps used as a light source for projecting a part's shadow.

SUMMARY OF THE INVENTION

As a means of resolving the problem of blown out incandescent lamps, the present invention incorporates the use of LED lamps. Moreover, several tangible improvements are realized by the use of a plurality of LED (Light Emitting Diode) lamps.

Its been over 30 years since the introduction of the first LED and at long last there is now a white LED that begins to rival incandescent in many architectural and small area illumination applications.

LEDs have enjoyed a tremendous growth over the last several years with new applications ranging from automotive lighting and VMS (Variable Message Signs) to traffic control devices. Much of this is due to the ever-increasing levels of brightness being achieved with new materials and wafer fabrication processes as well as the advances in package and optics design. Several of the most significant areas of expansion however, have resulted from the introduction of the blue LED in the early 1990's. This allowed for the manufacture of RGB (Full Color) signage as well as the development of white LEDs in the late 1990's.

A major aspect of the invention therefore, is the implementation of white and green LED lamps as a light source for optical projection tools. Another aspect of the invention is to provide field repair units for retrofitting existing comparators with LED lamps. The invention is also concerned with improvements in image resolution, contrast, reduced chromatic aberration, image quality and optics where images are seen on screen in the same orientation as seen on the part holder.

An optical projector using LED illumination can now be used in metrology laboratories having temperature and humidity controlled environments. In the past, semiconductor metrology laboratories prohibited the use of incandescent lamps since room temperature must be controlled well within 1 degree Celsius. Measurement data is recorded under stabilized ambient conditions prohibiting the use of prior art projector systems using incandescent lamps. Incandescent lamps waste about 95% of the power they consume to heat. LEDs, on the other hand, waste about 4%. Additionally, using LEDs lengthens the average lifetime of the LED lamp to 100,000 hours versus 80 to 500 hours for incandescent lamps.

It is therefore a primary object of the present invention to provide a single LED lamp or an array of LED lamps having wavelengths of light, i.e., green (550 nm) for profile (shadow) illumination and white light for front side and oblique illumination.

It is another object of the present invention to further improve optical comparators by offering users the choice of backside (profile), front side (coaxial) or off-axis (oblique) illumination or a combination of these, depending on need.

It is still another object of the present invention to improve profile image projection by using a monochromatic green wavelength LED lamp(s) to improve image contrast by substantially reducing distortions caused by chromatic aberration.

It is yet another object of the present invention to improve the resolution and depth of field for the projected image by having an adjustable diaphragm strategically placed within the optical image path.

It is another object of the invention to provide LED field replacement kits for retrofitting existing machines using incandescent lamps to our previous manufactured comparators and also our competitor's comparators.

It is still another object of the present invention to provide energy efficient illumination and energy savings.

It is another object of the present invention to eliminate a constant noise level of about 90 dBs caused by cooling fans needed to cool the incandescent lamps.

It is still another object of the present invention to provide a turret of telecentric lenses to offer a selectable range of magnifications.

It is yet another object of the present invention to provide corrected images in both the X and Y axis.

These objects are achieved by providing a novel illumination means for an optical system that projects and enlarges an image of an object, either from behind the object for profile (shadow) projection or in front of the object for incident projection along an optical path onto a glass screen for inspection.

A high intensity/low energy light source configured from a plurality of contiguously demountable lamps disposed on a substrate. The substrate having a front and a back surface is removably mounted within a housing.

For profile (shadow) projection, a first housing is mounted behind the object while using a monochromatic green lamp(s) for illumination. For incident illumination, a second housing is placed in the projection path in front of the object.

The light sources for the second housing are placed concentric to an aperture located on the optical center and coaxial with the optical path. The aperture extends from the front to the back surface of the substrate. The object receives incident light from a first element relay lens situated between the high intensity light source and the object. A reflected image is coaxially returned via the first element relay lens. The reflected image rays converge to pass through the aperture and an adjustable diaphragm disposed behind the aperture. A second element relay lens is placed to receive the image rays therethrough passing the rays to a coated telecentric parfocal lens, thereafter, displaying a magnified real image on a high resolution lapped glass screen for inspection.

For profile projection, the profile of the object is illuminated from behind using a monochromatic green light source. The profile rays pass through the first element relay lens converging to pass through the aperture of the second housing and thereafter follows the identical projection path described for incident projection.

Other objects and a fuller understanding of the invention may be had by referring to the following specification and claims taken in conjunction with the following drawings.

DESCRIPTION OF THE DRAWINGS

FIG. 2 shows a three dimensional schematic of a projection system for displaying an image that includes profile illumination means of the present invention.

FIG. 3 shows a view of an image, of the present invention, projected on a glass screen displaying a profile (shadow) of an object that is monochromatically illuminated from its back side.

FIG. 4 shows a three dimensional schematic of a projection system using oblique (dark field) illumination means of the present invention.

FIG. 5 shows a view of an image, of the present invention, using dark field illumination for displaying surface anomalies.

FIG. 6 shows a front view of a LED array kit of an embodiment of the present invention.

FIG. 7 is a side view of the LED array kit of the present invention.

FIG. 8 illustrates an LED array substrate of the present invention.

FIG. 9 illustrates another LED array substrate of the present invention.

DETAILED DESCRIPTION OF THE PREFERRED EMBODIMENT

Figure 1A:
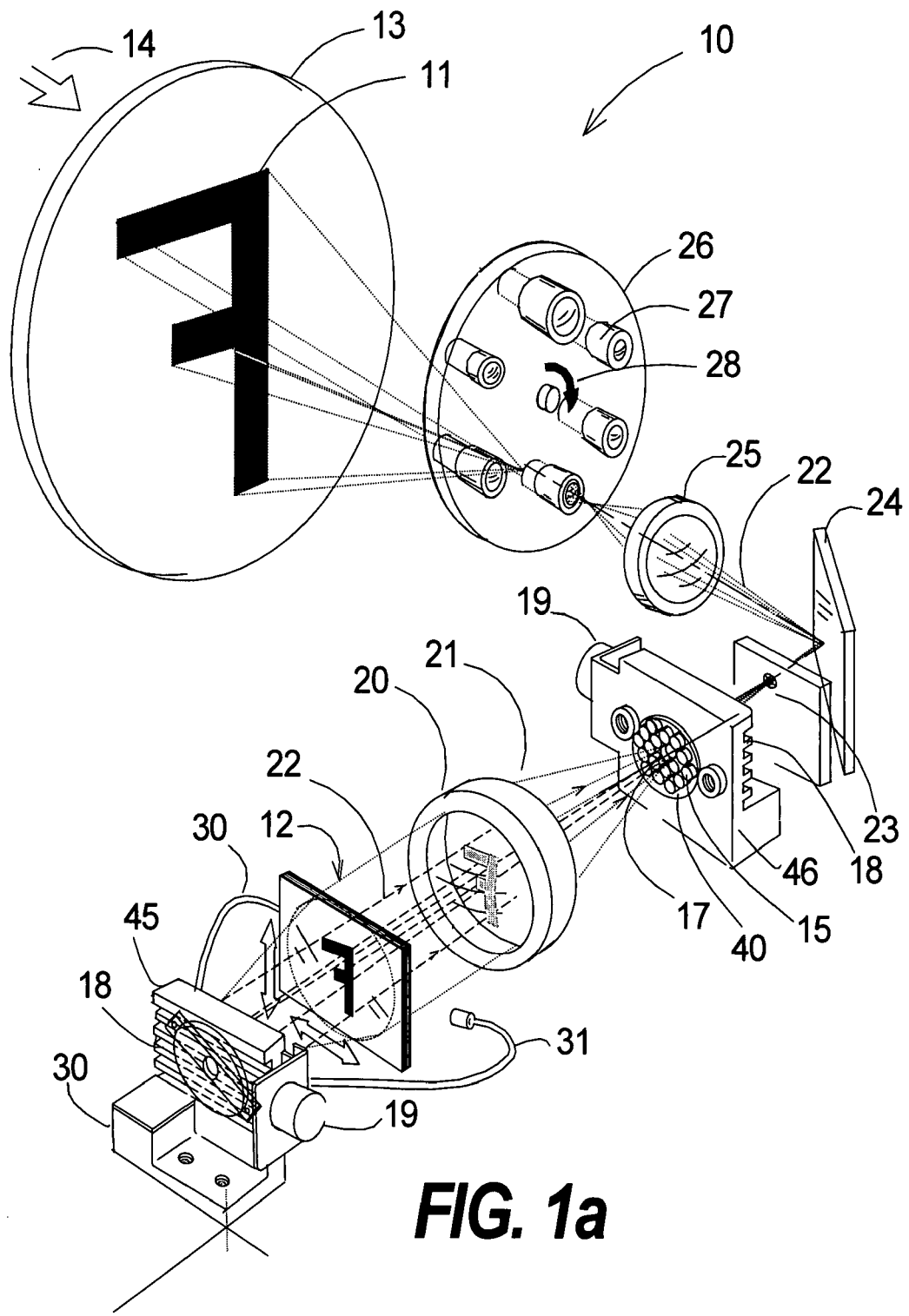
FIG. 1a shows a three dimensional schematic of a projection system for displaying a shadow image that includes monochromatic illumination means of the present invention.
Figure 1B:
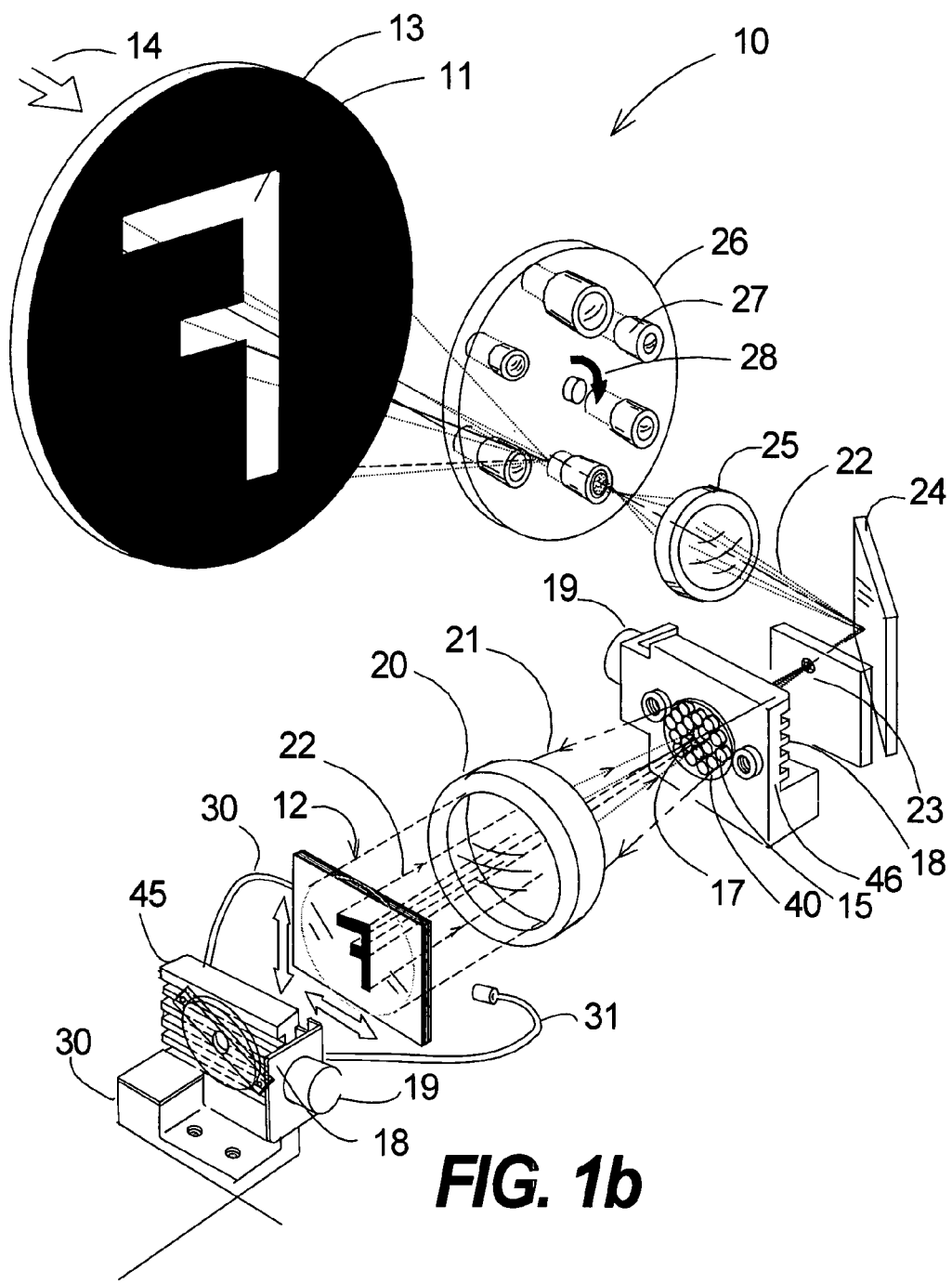
FIG. 1b shows a three dimensional schematic of a projection system for displaying an image that includes white light front side illumination means of the present invention.

The present invention will be described generally in terms of a preferred embodiment with references to FIGS. 1a and 1b showing optical schematics of an inspection-type image viewing apparatus that includes an optical projector 10 of the present invention. As shown, in FIGS. 1a and 1b, the optical system independently projects bright, enlarged and corrected images 11 either from the back or from the front surfaces of an object 12 onto a glass screen 13. The observer is viewing the image 11 from the direction indicated by arrow 14. The optical projector includes the following major improvements:

Also now referring to FIGS. 6-9, illumination is provided by interchangeable rectangular shaped housings 45 and 46 for shadow, backside or for oblique lighting. High intensity LED lamps 15 demountably disposed on the front side of a substrate 40 mounted within the rectangular shaped housing 45 and 46. Each lamp is configured with a LED casing 16 (see FIG. 6) and a curved acrylic reflector that collimates the emitted light. The front surface of the substrate 40 is designed to accept a patterned plurality of contiguously mounted high intensity LED lamps 15, either monochromatic or white light, and at least one individual feed circuit (not shown). The LED lamps are disposed in a circular interstices pattern and concentric to a cavity 17 extending from the front surface of the substrate 16 to its back surface.

The back side of the LED substrate 40 and housings 45 and 46 are provided with aligned radiating fins 18 to help dissipate heat generated by the closely patterned LED lamps. An optional electronic cooling fan 19 may be used to provide air cooling. Since LED lamps operate at much cooler temperatures compared to incandescent lamps the arrangement can be grouped contiguously as best shown in FIG. 6. This arrangement permits several options when illuminating an object for image projection. These choices are illustrated in FIGS. 1 and 6-9.

a) "coaxial" (front side, or bright field) illumination is illustrated in FIG. 1.
 b) "profile" or "shadow" (illuminating from the back side of an object) with monochromatic LED lamps as illustrated in FIGS. 1a, 2 and 3 showing the profile of object 11.
 c) "oblique" or "dark field" (off-axis lighting) is illustrated in FIGS. 4 and 5 showing reflected anomalies 29 created by grazing illumination projected from fiber cables 30 and 31 placed to illuminate with collimated light at a shallow angle relative to the surface of object 12.

Profile and oblique illumination methods are conventional methods largely used with incandescent lighting in prior art applications.

Profile illumination, shown in FIG. 1a, is accomplished by the arrangement of the LED lamps 15 and the placement of a first housing 45 relative to a first relay lens 20. This lens 20 collects parallel light 21 emitted from the LED array, behind the object, and converges the profile image rays 22 through a cavity 17 contained in a second housing 46 and through an adjustable diaphragm 23 disposed proximate and behind substrate 40. The adjustable diaphragm functions as an aperture stop provided in the space between the first element relay lens 20 and a second element relay lens 25. The diaphragm 23 is placed and adjusted to enhance image resolution by removing skew rays and to minimize the effects of stray light rays which produce halos and certain aberrations while increasing the depth of focus.

The projected image rays 22, whether illuminated from the back side, front side or by the oblique mode, are projected along identical optical paths in the projection optical system of the present invention. As shown in FIGS. 1a and 1b, the optical system includes a first element relay lens 20, and LED substrate 40 assembled with the second housing 46 that has a cavity 17 whose center is coincident to the optical center of the first element relay lens. The image rays 22 converge upon exiting the first element relay lens 20 passing through cavity 17 and through the adjustable diaphragm 23 disposed proximate and behind substrate 40.

A mirror 24 is shown to divert the projected image rays 22 for the purpose of illustration, however, mirrors are used in optical projectors to facilitate packaging and positioning of the glass screen for viewing comfort. Such reflection is called a specular reflection with no degradation to the image rays.

The image rays 22 enter a second element relay lens 25 from its long conjugate and exits to its short conjugate while converging to its focal point. The image rays diverge to fill the entering pupil of a coated telecentric lens 27. The optical comparator 10 illustrates a plurality of telecentric lenses 27 mounted on a rotatable lens holder 26 for positioning a specific telecentric lens by rotating lens holder 26 about a fixed axis 28. The telecentric lens is selected based on the required magnification and image resolution needed for the task of inspection and measurement. The projected image 11 is shown projected on the glass screen 13.

FIGS. 6-9 illustrate a retrofitting kit designed to replace incandescent lamp assemblies used on most optical comparators. The kit assembly which includes a rectangular shaped housing 45 installed so that illumination can be projected either vertically or horizontally and in any direction using a plurality of mounting holes 47. The kit includes a LED substrate 40 demountably held in place with flanges 41 and fasteners 42. The substrate 40 includes a plurality of high intensity LED lamps 15 as illustrated in FIGS. 8 and 9 and at least two receptacles 29, 30 for receiving flexible glass fiber cables used for oblique and grazing illumination. At least one LED lamp provides the light source for the fiber cables. The LED lamps are positioned behind each receptacle.

Each LED lamp 15 is demountably disposed on the front side of the substrate 40 for ease of servicing. Each lamp is configured with a LED casing 16 and a curved reflector that collimates the emitted light. The front surface of the substrate 40 is designed to accept a patterned plurality of contiguously mounted high intensity LED lamps 15 and at least one individual feed circuit powered by solid state power supplies 48. The LED lamps are disposed in a circular interstices pattern and concentric to a cavity 17 extending from the front surface of the substrate 16 to its back surface. Cavity 17 can be used as an optical center for passing a projected image or for placing another LED lamp.

The retrofitting kit can be used for "front side" or "bright field", "profile" or "shadow" and "oblique" or "dark field" lighting as illustrated in FIG. 1 and FIGS. 2-9

In summary a high intensity light source configured from a plurality of contiguously demountable light sources disposed on a heat conductive substrate, having a front and a back surface, the light sources are placed concentric to an aperture located central to the optical path, the aperture extending from the front to the back surface.

The object receives incident light from a first element relay lens situated between the high intensity light source and the object; a reflected image is coaxially returned through the first element relay lens, and the reflected image converges and projects through the aperture and an adjustable diaphragm is disposed behind the aperture. A second element relay lens is placed to receive the image rays while passing the image to a coated telecentric parfocal lens, thereafter, displaying a magnified real image on a ground glass screen for inspection.

Moreover, a retrofit kit is provided for replacing incandescent lamps used for incident, profile and grazing illumination in optical systems that enlarge and projects images of objects along optical paths to glass screens for inspection and measurement.

The retrofit kit includes an "L" shaped housing having a centered circular opening on its vertical member and at least two fiber optic cable adapters positioned in front of respective lamp illuminators located on opposite sides of the circular opening, the housing includes a base member with a compartment. A circular substrate is removeably assembled within the circular opening. The circular substrate has a plurality of contiguously demountable lamps disposed in several available patterns. The lamps are powered by at least one feed circuit. The substrate has a front and a back surface. The lamps are placed concentric to an aperture located coaxial to an optical path. The aperture extends from the front to the back surface.

Mounting holes are provided to mount the retrofit kit housing for vertical or horizontal projection of light.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. An illuminating optical system for projecting an image of an object along an optical path to a glass screen for inspection, comprising high intensity light sources for illuminating surfaces of said object, said light sources configured from a plurality of contiguously demountable lamps disposed on circular substrates, said circular substrates having front and back surfaces, said substrates removably mounted on a housing, a first housing disposed behind said object, a second housing disposed in front of said object;

said lamps placed concentric to an aperture located on center of said substrates and coaxial with said optical path, said aperture extending from said front to said back surfaces of said substrates.

2. The illuminating optical system of claim 1 wherein said high intensity light source comprises an array of light emitting diode (LED) lamps, selected from the group consisting of monochromatic green or white light, said lamps having an acrylic reflecting collimator are disposed in a circular interstices pattern encircling said aperture.

3. The illuminating optical system of claim 1 wherein said substrate includes heat radiating surfaces formed on opposite side of LED array for air cooling of said contiguously arranged LEDs.

4. The illuminating optical system of claim 3 wherein said air cooling can be assisted with a quiet electronic muffin fan.

5. The illuminating optical system of claim 1 wherein said substrate includes at least one electrical feed circuit to power said LEDs.

6. The illuminating optical system of claim 1, further comprising:

illuminating said object from behind with light sources contained in said first housing;

said profile image rays are projected through a first element relay lens situated in front of said object;

said projected image rays converge and project through said aperture of said circular substrate disposed on said second housing and through an adjustable diaphragm disposed behind said aperture of said second housing; a second element lens is disposed to receive said profile image rays while passing said profile image rays to a coated telecentric parfocal lens, thereafter displaying a magnified real image on a high resolution lapped glass screen for inspection.

7. The illuminating optical system of claim 6 wherein mirrors can be interposed between said first and second element relay lenses for packaging purposes and between said coated telecentric parfocal lens and said ground glass screen to enlarge said projected image.

8. The illuminating optical system of claim 6 wherein said diaphragm is placed to remove certain skew rays to minimize the effects of certain aberrations.

9. The illuminating optical system of claim 6 wherein the placement of said second housing provides incident illumination to said object.

10. The illuminating optical system of claim 6 wherein said coated telecentric parfocal lenses are selected from a group consisting of magnifications ranging from 5x to 500x, said lenses demountably positioned on a rotatable lens holder having at least two lens positions.

11. The illuminating optical system of claim 1, further comprising:
illuminating said front surface of said object with light sources contained in said second housing;
said object receives collimated incident light from a first element relay lens situated between said second housing and said object;
reflected image rays are coaxially returned through said first element relay lens, said reflected image rays converges and projects through said aperture of said circular substrate disposed on said second housing and through an adjustable diaphragm disposed behind said aperture of said second housing;
a second element lens is disposed to receive said reflected image rays while passing said reflected image rays to a coated telecentric parfocal lens, thereafter displaying a magnified real image on a high resolution lapped glass screen for inspection.

12. The illuminating optical system of claim 11 wherein mirrors can be interposed between said first and second element relay lenses for packaging purposes and between said coated telecentric parfocal lens and said ground glass screen to enlarge said projected image.

13. The illuminating optical system of claim 11 wherein said diaphragm is placed to remove certain skew rays to minimize the effects of certain aberrations.

14. The illuminating optical system of claim 11 wherein the placement of said second housing provides incident illumination to said object.

15. The illuminating optical system of claim 11 wherein said coated telecentric parfocal lenses are selected from a group consisting of magnifications ranging from 5x to 500x, said lenses demountably positioned on a rotatable lens holder having at least two lens positions.

16. A method for illuminating and projecting an image of an object along an optical path to a glass screen for inspection, said method comprising the steps of:
providing a first and a second high intensity light source configured from a plurality of contiguously demountable lamps disposed on circular substrates, said substrates having a front and a back surface, each said substrate removably mounted on a housing, said light sources placed concentric with an aperture located coaxial to said optical path, said aperture extending from said front to said back surface;
providing a monochromatic first light source for profile projection, said object is placed between said first light source and a first element relay lens;
providing a second light source for incident (front side) projection, said object receives collimated white light from a first element relay lens situated between said second light source and said object;
an image of said object's surface is reflected and coaxially returned through said first element relay lens, thereafter converging and projecting through said aperture of said second housing and an adjustable diaphragm disposed behind said second housing;
providing a second element relay lens placed to receive said image while passing said image into a provided telecentric parfocal lens, thereafter, displaying a magnified real image on a high resolution lapped glass screen for inspection.

17. The method of claim 16 wherein said high intensity light source comprises an array of light emitting diodes (LEDs) lamps, selected from the group consisting of monochromatic green or white light, said lamps having an acrylic reflecting collimator are disposed in a circular interstices pattern encircling said aperture, each of said LEDs having an acrylic reflecting collimator.

18. The method of claim 16 wherein said substrate includes heat radiating surfaces formed on opposite side of LED array for air cooling of said contiguously arranged LEDs.

19. The method of claim 16 wherein said air cooling can be assisted with a fan.

20. The method of claim 16 wherein said heat conductive substrate includes at least one electrical feed circuit to power said LEDs.

21. The method of claim 16 wherein mirrors can be provided to be interposed between said first and second element relay lenses for packaging purposes and between said coated telecentric parfocal lens and said ground glass screen to enlarge said projected image.

22. The method of claim 16 wherein said diaphragm is provided to remove certain skew rays to minimize the effects of certain aberrations and to extend depth of focus.

23. A method for illuminating and projecting a dark field image of an object along an optical path to a glass screen for inspection, said method comprising the steps of:
providing grazing illumination on a front surface of said object using a pair of angular positional fiber optic cables each having an input of high intensity light at one end and a lens adjustable diffuse cone of light emitted from the other end;
said dark field image is projected through a first element relay lens situated in front of said object;
said dark field image converges and projects through an adjustable diaphragm;
providing a second element relay lens placed to receive said image while projecting said image to a coated telecentric parfocal lens, thereafter, displaying a magnified dark field image on a high resolution lapped glass screen for inspection.

24. The method of claim 23 wherein a housing having at least two high intensity LED lamps, said housing provided with a receptacle at each lamp location, said receptacle receives one end of said fiber optic cable, the other end having a lens assembly that is adjustable to provide oblique illumination for projecting said dark field image.

25. The method of claim 23 wherein said grazing illumination discerns three dimensional surface anomalies.

26. The method of claim 23 wherein said coated telecentric parfocal lenses are selected from a group consisting of magnifications ranging from 5x to 500x, said lenses demountably positioned on a rotatable lens holder having at least two lens positions.

* * * * *